3,038,554
PORTABLE WINDOW SEAT
Andrew R. Swaney, Youngstown, Ohio
(P.O. Box 3091, San Jose, Calif.)
Filed Apr. 17, 1961, Ser. No. 103,410
3 Claims. (Cl. 182—58)

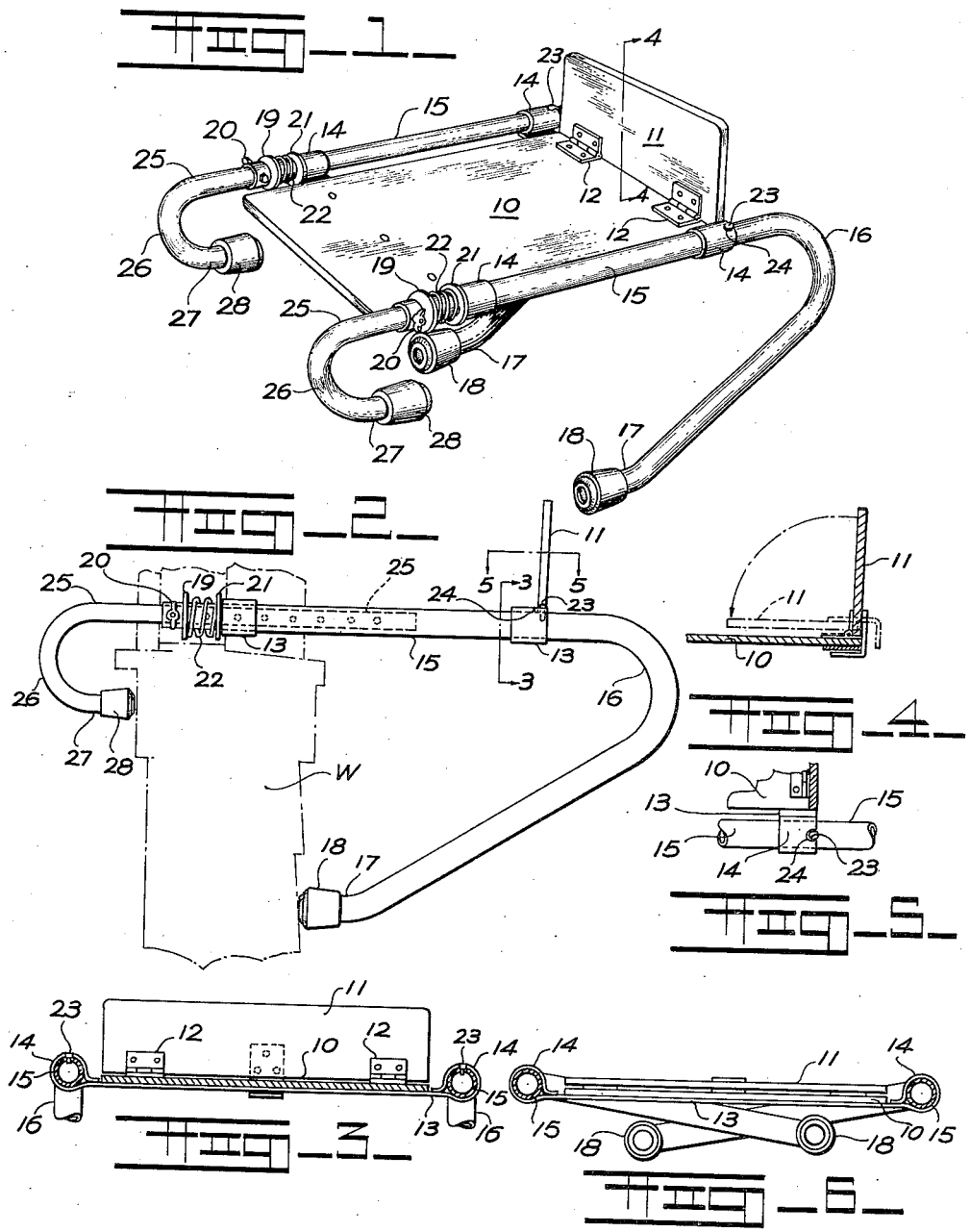

This invention relates to a window seat and more particularly to a portable window seat that may be positioned in an open window to extend outwardly therefrom and form a seat.

The principal object of the invention is the provision of a portable window seat which is light in weight, easy to handle, and may be conveniently installed in a window opening.

A further object of the invention is the provision of a window seat in which adjustable arms provide for accommodating various thicknesses of walls and/or various widths of window sills.

A still further object of the invention is the provision of a window seat having a rigid seat portion and adjustable supporting arms pivotally secured to the sides thereof so that the same may be collapsed thereagainst.

A still further object of the invention is the provision of a window seat having a rigid seat portion and a rigid back portion hinged thereto and arranged to be collapsed thereagainst.

The window seat disclosed herein comprises an improvement in the art in that a simple, less complex and less expensive construction is disclosed as compared with window seats heretofore known. The window seat disclosed herein provides for automatically locking the supporting arms in supporting position and insures retention of said arms in said supporting position whenever the window seat is in use.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of the window seat.

FIGURE 2 is a side view of the window seat with broken lines illustrating a portion of a wall and window opening.

FIGURE 3 is a vertical section on line 3—3 of FIGURE 2.

FIGURE 4 is a vertical section on line 4—4 of FIGURE 1.

FIGURE 5 is a horizontal section on line 5—5 of FIGURE 2.

FIGURE 6 is a front view of the window seat with the arms in folded position and parts in cross section.

By referring to the drawings and FIGURES 1 and 2 in particular, it will be seen that a window seat has been disclosed which includes a seat portion 10 having a back 11 hinged thereto by hinges 12, 12. The seat 11 is supported on transversely positioned straps 13, 13 the ends of which are formed into loops 14, 14 loosely engaged around spaced areas on a pair of spaced arms 15, 15.

The arms 15, 15 each have two straight sections, one of which is longer than the other and are on either side of curved sections 16, 16, the shorter straight sections of the arms 15 are bent on slight angles as at 17, 17 and provided with rubber friction caps 18, 18. The other ends of the arms 15, 15 are straight and provided adjacent their ends with annular collars 19, 19 secured by fasteners 20, 20 positioned therethrough. The looped ends 14, 14 of the band 13 adjacent the front of the seat 10 are provided with flanges 21, 21 and coil springs 22, 22 are disposed between the flanges 21, 21 and the flanges 19, 19 heretofore referred to. Pins 22, 23 engaged in the arms 15 adjacent the curved portion 16 thereof are adapted to move into registry with slots 24, 24 in the loops 14, 14 adjacent the back of the seat 10 as best seen in FIGURE 5 of the drawings.

A pair of secondary arms 25, 25 each having curved outer ends 26, 26 are telescopically engaged in the arms 15, 15 and the fasteners 20, 20 engage one of a series of openings in each of these secondary arms 25, 25 as seen in FIGURE 2 of the drawings. The outer ends of the secondary arms 25, 25 have straight sections 27, 27 provided with rubber friction caps 28, 28.

By referring now to FIGURE 2 of the drawings in particular, it will be seen that broken lines indicate a building wall W having a window opening therein in which the window seat is positioned. It will be seen that the ends 27, 27 of the secondary arms 25, 25 engage against the window casing on the inside of the wall and that the secondary arms 25, 25 extend outwardly through the window opening and engage the arms 15, 15 so that the ends of the arms 15, 15 may be positioned against the outer side of the wall W. In such position, the seat 10 is horizontal, the back 11 is vertical and the device is capable of securely holding a person. When the arms 15, 15 are to be folded as shown in FIGURE 6, the arms 15, 15 are moved longitudinally of the straight sections thereof through the loops 13, 13 so as to partially compress the coil springs 22, 22 and thereby move the pins 23, 23 out of engagement with the slots 24. The curved ends of the arms 15, 15 may then be swung up into the folded position shown in FIGURE 6.

When a thicker or thinner wall is to be accommodated the fasteners 20, 20 are removed, the secondary arms 25, 25 are positioned to receive the particular wall thickness and the fasteners 20, 20 are positioned in one of the appropriate openings in the secondary arms 25, 25 and secured. Thus, the device may be easily adapted to any wall thickness and window opening and it will be observed that it provides a simple and efficient, easily manipulated window seat meeting the several objects of the invention, and having thus described my invention, what I claim is:

1. A window seat comprising a rigid seat portion having transverse bands therebelow with loops on their outermost ends, a pair of tubular arms having straight sections movably engaged in said loops and positioned one at either side of said seat section, said arms having inwardly and downwardly curving end portions and a pair of secondary arms having straight sections telescopically engaged in said first-mentioned arms and removable fasteners securing the same together, said secondary arms having inwardly and downwardly curved end sections, and spring means positioned between the ends of said first pair of arms and said loops through which said arms are positioned and normally biasing said arms in one direction relative to said loops and pin means in said arms for movably engaging notches in said loops for temporarily holding said arms in predetermined position.

2. The window seat set forth in claim 1 and wherein apertured collars are positioned one on each of said secondary arms and wherein said removable fasteners engage said collars and wherein said spring means are positioned between said collars and said loops.

3. The window seat set forth in claim 1 and wherein a back section is hingedly secured to said seat section for positioning in right angular relation thereto.

References Cited in the file of this patent
UNITED STATES PATENTS

| | | |
|---|---|---|
| 1,327,025 | Crozier | Jan. 6, 1920 |
| 1,365,695 | Landstra | Jan. 18, 1921 |
| 2,052,439 | Bailey | Aug. 25, 1936 |